No. 702,227. Patented June 10, 1902.
J. H. LOHNER.
DERRICK FRAME AND JOINT COUPLING THEREFOR.
(Application filed Mar. 5, 1902.)
(No Model.) 2 Sheets—Sheet I.
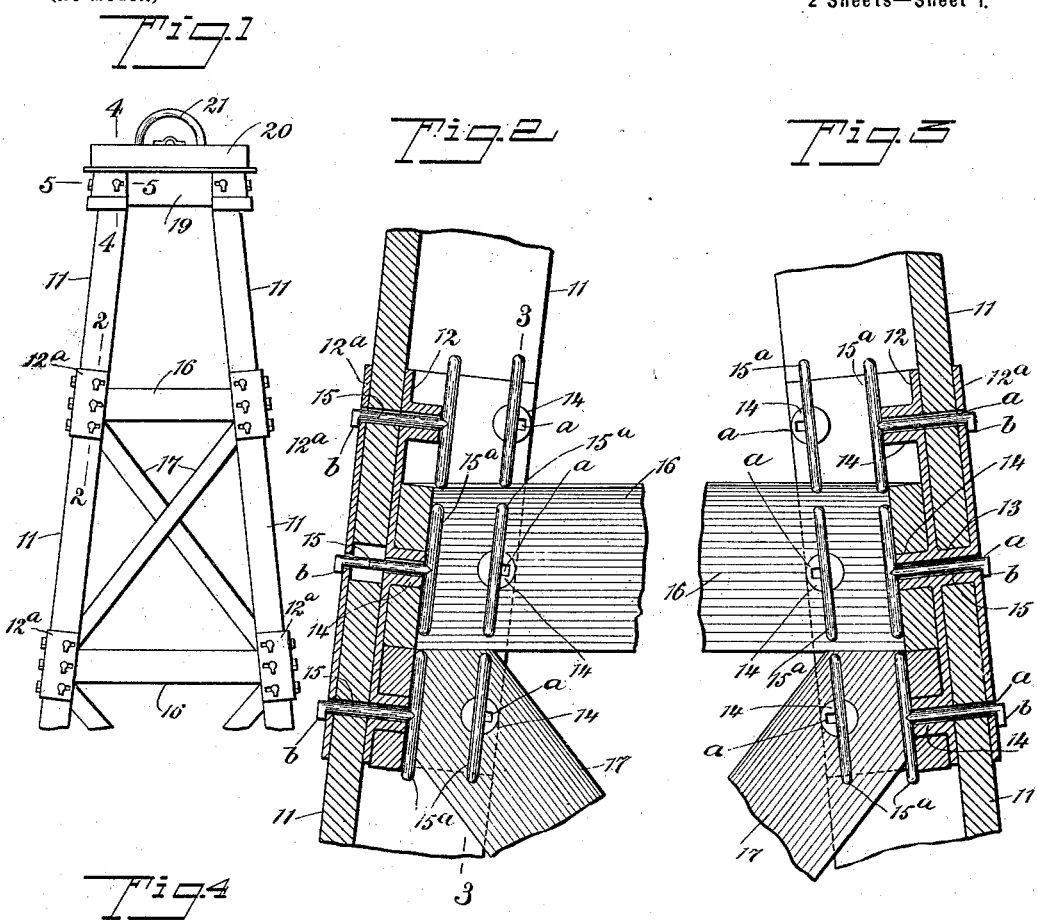
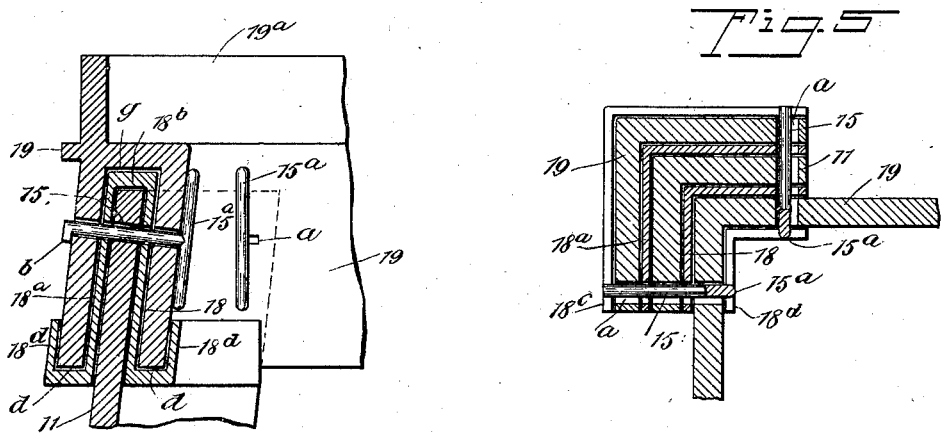
WITNESSES:
J. A. Brophy
W. L. Patton
INVENTOR
Joseph H. Lohner
BY
Munn
ATTORNEYS
THE NORRIS PETERS CO., PHOTO-LITHO., WASHINGTON, D. C.

No. 702,227. Patented June 10, 1902.
J. H. LOHNER.
DERRICK FRAME AND JOINT COUPLING THEREFOR.
(Application filed Mar. 5, 1902.)
(No Model.) 2 Sheets—Sheet 2.
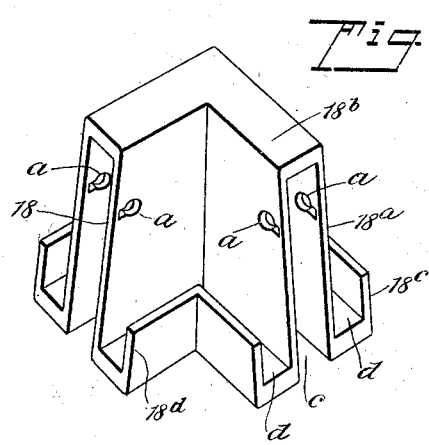
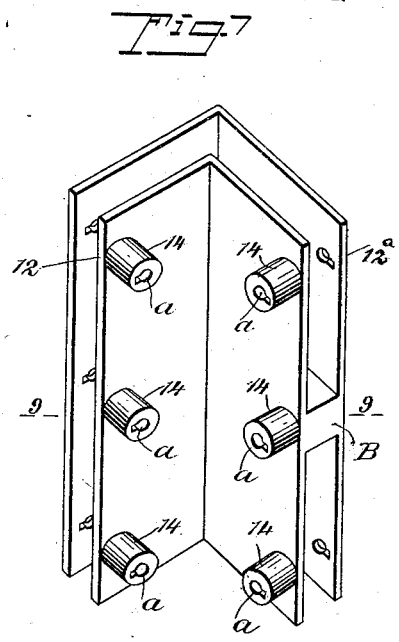
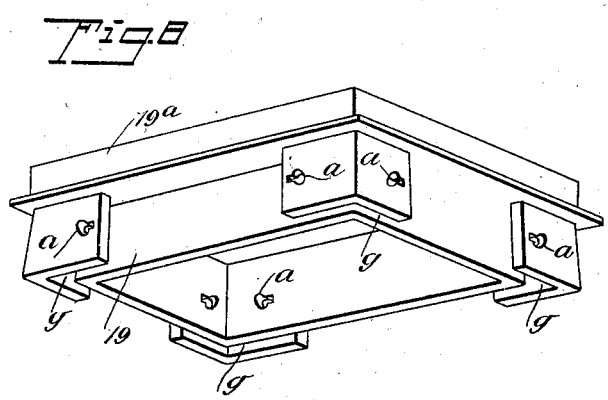
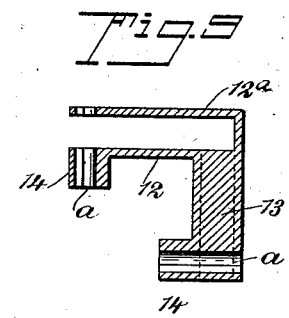
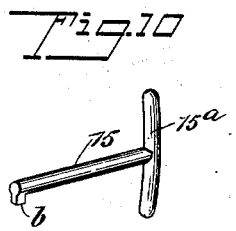
WITNESSES:
INVENTOR
Joseph H. Lohner
BY
ATTORNEYS

UNITED STATES PATENT OFFICE.

JOSEPH HENERY LOHNER, OF BRADFORD, PENNSYLVANIA.

DERRICK-FRAME AND JOINT-COUPLING THEREFOR.

SPECIFICATION forming part of Letters Patent No. 702,227, dated June 10, 1902.

Application filed March 5, 1902. Serial No. 96,786. (No model.)

*To all whom it may concern:*

Be it known that I, JOSEPH HENERY LOHNER, a citizen of the United States, and a resident of Bradford, in the county of McKean and State of Pennsylvania, have invented a new and Improved Derrick-Frame and Joint-Coupling Therefor, of which the following is a full, clear, and exact description.

This invention relates to derricks used in the drilling of deep wells and for other purposes, and has for its object to provide a derrick-frame, which may be formed either of wood or of metal, with novel details of construction that adapt the parts thereof for very convenient and reliable connection when the frame is being erected and also enable their detachment readily when the derrick is to be removed.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a side view of the upper portion of a derrick-frame embodying features of the invention. Fig. 2 is an enlarged longitudinal sectional view taken substantially on the line 2 2 in Fig. 1. Fig. 3 is a longitudinal sectional view taken substantially on the line 3 3 in Fig. 2. Fig. 4 is an enlarged longitudinal sectional view taken substantially on the line 4 4 in Fig. 1. Fig. 5 is an enlarged sectional plan view taken substantially on the line 5 5 in Fig. 1. Fig. 6 is a perspective view of a corner hanger-iron for the top of the derrick-frame. Fig. 7 is a perspective view of a coupling for the leg portions of the derrick-frame. Fig. 8 is a perspective view of the top ring of the derrick-frame and the corner-brackets therefor. Fig. 9 is a transverse sectional view substantially on the line 9 9 in Fig. 7, and Fig. 10 is a perspective view of a locking-key employed.

The legs or corner-posts of the derrick-frame are each formed of similar straight bars 11, technically known as "angle-bars," and which may be of wood or metal, each being L shape in cross-section. The several bars 11, that together form a corner-post for the derrick-frame, are connected together in sequence by novel coupling-boxes that individually receive and hold in alinement the end portions of two adjacent bars 11, said coupling-boxes being each constructed as follows: Two right-angularly bent wall-plates 12 12$^a$ are held suitably spaced apart in parallel planes by an integral or secured transverse web-block 13, that is positioned at the longitudinal center of the wall-plates, as best shown in Figs. 7 and 9. From the inner surface of the inner wall-plate 12 three bosses 14 are projected at equal distances of separation along each free side edge of said wall-plate, two bosses at each edge being located near ends of the plate 12 and the intermediate boss at its longitudinal center, so that the central boss at one side edge will be disposed directly opposite the web-block 13, which, as shown in Fig. 9, extends toward the angular corner of the outer wall-plate 12$^a$, but is of such length as to aline its inner end with the inner surface of the leaf of the inner wall-plate 12 not in contact with the web-block.

It will be seen that by the described construction each coupling-box will be adapted to receive the L-shaped ends of two angular bars 11, the space between the right-angular wall-plates 12 12$^a$ affording channels wherein the flanges of the angular bars will slide and fit neatly, whereby said angular bars are nearly joined endwise, the web-block 13 intervening them.

Through the center of each boss 14 and the wall-plates 12 12$^a$, opposite the boss, a key-hole-shaped perforation $a$ is formed, and a suitable number of peculiarly-formed locking-keys is provided for engagement with these keyhole-perforations, said keys each having a cylindrical barrel or shank 15, terminating at one end in a cross handle-bar 15$^a$ and in a lateral locking-toe $b$ at the other end, as shown in Figs. 2, 3, and 10.

In order to permit of connecting together the ends of the post-sections or angular bars 11 and holding them in the coupling-boxes, the flanges of these bars are perforated opposite and similarly to the perforations in the bosses 14, and when the coupling-boxes are correctly adjusted upon the alined angular bars a locking-key of the described construction is inserted through each boss and perforated flange of the post-sections or bars, so that the locking-toes b will be outside of the wall-plate 12ª and the handle-bar 15ª have contact with the inner wall-plate 12. It will be seen that by forcibly turning the handle-bar 15ª of each locking-key one-fourth of a revolution in either direction the toe b on each shank 15 will be similarly turned and made to bear upon the wall-plate 12ª, which will secure together the engaged parts through which the key-shanks pass. To render the locking-keys more efficient, the cross-bar or handle 15ª is preferably given a slightly-arched form, as shown in Fig. 10, and the keys are formed of resilient metal, so that if the length of the shanks 15 is correctly proportioned the handle-bar and toe on each key will be pressed forcibly upon the respective wall-plates 12 12ª and the handle-bar that is normally bent slightly will be straightened, its resilience serving to compensate for any slight looseness between the engaged parts, and the keys be adapted to firmly but detachably hold the coupling-boxes in engagement with the post-sections.

In the construction of the derrick-frame the four sectional posts formed of angle-bars joined together endwise by means of the described coupling-boxes are suitably spaced apart and connected together, so that they will have their angular corners disposed at the corners of the derrick-frame, and the posts be similarly inclined inwardly at their upper ends by means of the cross-beams 16 and the diagonal braces 17. The cross-beams 16 are held at their ends upon the wall-plates 12 of the respective coupling-boxes, there being four cross-beams thus engaged with each set of four coupling-boxes provided to connect the ends of the corner-post members 11, and to accomplish this the cross-beams near their ends are transversely apertured for the reception of the central bosses 14 on appropriate wings of the inner wall-plate 12, as clearly shown in Figs. 2 and 3, these bosses receiving the improved keys, whose shank members 15 pass through the bosses and lock their toes b upon the outer wall-plates 12ª, while the cross-handles 15ª forcibly contact with the inner faces of the cross-beams, as represented in Figs. 2 and 3. The diagonal braces 17 are provided in pairs for each side of the derrick-frame, and each pair crosses, as shown in Fig. 1, the ends of the braces being cut to fit against one cross-beam 16 and likewise abut laterally upon an end of a similar brace disposed at a right angle thereto. The end portions of the diagonal braces 17 are suitably apertured for the reception of appropriate bosses 14 and are secured by duplicates of the T-shaped keys, which have been described, so that the cross-beams 16 and diagonal braces 17 will be detachably secured upon the inner surfaces of the inner wall-plates 12 of the improved coupling-boxes when the derrick-frame is erected for service. It is to be understood that any necessary number of the cross-beams and diagonal braces are to be employed for stiffening the derrick-frame.

Upon the upper ends of the derrick-posts 11 four similar corner-brackets are hung, said parts being each constructed as shown best in Fig. 6 and consisting of the following details: Two L-shaped wall-plates 18 18ª are held spaced apart and parallel by an integral web 18ᵇ, which joins the upper edges of the wall-plates together and disposes the bodies of said plates at such a degree of separation as will afford an L-shaped recess c between the wall-plates for the reception of the upper end of a respective angle-iron post member 11, whereon said bracket may be hung, as represented in Figs. 1 and 4. The wall-plates 18 18ª, that are disposed, respectively, on the inner and outer sides of the angle-iron post members 11 when in place, have return-bent hook-plates 18ᶜ 18ᵈ, respectively, formed on the lower edges of said wall-plates, these hook-plates being properly spaced, as at d, from the wall-plates and rendered parallel therewith. A cap-ring 19 is provided, that is preferably square in plan and is channeled at the corners from the lower edge upwardly, as shown at g, a sufficient distance to permit the corner-brackets to slide into said recess g its full depth, the side walls of the cap-ring that are spaced by the recess g then entering and seating in the recesses or spaces d, whereby the hook-plates 18ᶜ 18ᵈ respectively engage with the inner and outer walls of the cap-ring at its corners, as best shown in Fig. 4. It will be seen that when the cap-ring 19 is placed upon the corner-brackets mounted upon the upper ends of the derrick-frame posts the latter will be held spaced apart and braced at their upper ends in a reliable manner. The spaced walls of the cap-ring 19 and corner-brackets, together with each post 11, are perforated oppositely at proper points, these perforations a being keyhole-shaped to admit freely the shanks of keys, such as shown in Fig. 10, these keys when fully inserted and adjusted serving to secure the cap-ring in place on the derrick-frame. Upon the upper portion of the angular cap-ring 19 a border-flange 19ª is formed, that extends upwardly, and in the depression afforded inside of said flange a cap-plate 20 is seated, this forming the top wall of the derrick-frame and may be slotted for the reception of a bull-wheel 21, that is held to rotate therein, as usual.

It will be evident that by the improved details of construction hereinbefore described a strong light derrick-frame will be provided that is easily erected at a desired location and which may be taken down readily in a safe manner without other tools than a hammer.

Having thus described my invention, I claim as new and desire to secure by Letters Patent—

1. In a derrick, the combination with angular post-sections, of coupling-boxes adapted to embrace the end portions of adjacent post-sections, and means to secure said coupling-boxes in place on the post-sections.

2. In a derrick, the combination with a plurality of angular post-sections, of coupling-boxes, each recessed to receive the angularly-disposed flanges on alined ends of post-sections, and T-shaped keys adapted to detachably lock the coupling-boxes and post-sections together.

3. In a derrick, the combination with a plurality of angular post-sections and mating coupling-boxes therefor, of transvere spacing-beams which have their ends engaged with the coupling-boxes, and means to detachably secure the post-sections and beams to the coupling-boxes.

4. In a derrick, the combination with a plurality of angular post-sections, of substantially L-shaped coupling-boxes, each having two spaced angular walls between which the flanges of alined ends of the post-sections will fit, and means to detachably secure the angular post ends within the spaces between the angular walls of the coupling-boxes.

5. In a derrick, the combination with a plurality of angular post-sections, of substantially L-shaped coupling-boxes, each adapted to receive the end portions of angular post-sections, cross-beams engaged at their ends with opposite coupling-boxes, and keys insertible in perforations in the boxes and in flanges of the post-sections, said keys being adapted by partial rotation to lock the posts, beams and boxes together.

6. In a derrick, the combination with a plurality of angular corner-post sections and a plurality of mating L-shaped coupling-boxes adapted to receive the end portions of alined post-sections, of cross-beams engaged by their ends with the walls of the boxes, diagonal braces in like manner engaging their ends with the boxes, and T-shaped keys passed through alined perforations in the boxes, beams and braces, said keys by partial rotation securing the braces on the boxes and the ends of the cross-beams thereon.

7. In a derrick, the combination with four angular posts, of a set of corner-brackets, each adapted to seat upon a respective post and embrace its flanges, a cap-ring engaging the corner-brackets, and means to secure the post ends, corner-brackets and cap-ring together.

8. In a derrick, the combination with a plurality of angular posts, of recessed corner-brackets thereon, a recessed cap-ring seated over the corner-brackets in return-bent hooks thereon, and a cap-plate seated upon the cap-ring.

9. In a derrick of the character described, a plurality of coupling-boxes, each comprising two L-shaped wall-plates spaced apart by a transverse web-block disposed intermediately of their ends.

10. In a derrick of the character described, a plurality of locking-keys, each comprising a straight cylindrical shank, a cross-handle at one end of the shank, and a toe projected laterally at the opposite end of said shank.

11. In a derrick of the character described, a plurality of corner-brackets for the top of the derrick-frame, each comprising two L-shaped wall-plates, spaced apart in parallel planes by an integral web at their upper ends, each wall-plate having a hook-plate bent outward and upward at the lower end thereof.

12. In a derrick of the character described, the cap-ring, having rectangular form and also having an L-shaped recess at each corner.

In testimony whereof I have signed my name to this specification in the presence of two subscribing witnesses.

JOSEPH HENERY LOHNER.

Witnesses:
JAMES J. CLARK,
WILLIAM B. RHODES.